Nov. 20, 1945.　　　J. W. SIMMONS　　　2,389,278
FASTENING MEANS
Filed July 29, 1944

INVENTOR.
John W. Simmons,
BY
Hull & West,
ATTORNEYS

Patented Nov. 20, 1945

2,389,278

UNITED STATES PATENT OFFICE 2,389,278

FASTENING MEANS

John W. Simmons, Cleveland Heights, Ohio

Application July 29, 1944, Serial No. 547,199

5 Claims. (Cl. 85—32)

This application is a continuation in part of one filed October 15, 1943, Serial No. 506,385, issued as U. S. Patent No. 2,364,668 on December 12, 1944, and, as in the parent case, the general object of the invention is the production of an efficient, relatively simple and inexpensive, quick-acting fastener that is capable of being readily applied to an entering element, desirably threaded, as a screw or bolt, and that will, when compressed axially of the entering element, exert an extremely powerful hold thereon. The compression of the fastener, when a threaded entering element is employed, is effected by turning said element in an appropriate direction; while, in the case of a smooth entering element, or one characterized by transverse corrugations or a series of circumferential grooves, compression of the fastener is accomplished by applying force to the fastener, as by means of a tool, in a direction axially of the entering element.

Another object of the invention is to provide a fastener that may be simply and economically produced from linear material, such as strip metal, and which has a multiple thread contact, or its equivalent, with each of the opposite sides of an entering element wherewith it is used, thereby to materially increase its holding power over that of a fastener capable of only a single point or thread contact with each side of an entering element.

A further object of the invention is to provide a fastener constructed of an elongate piece of material and so designed that said piece may be punched or otherwise treated to produce apertures that are spaced apart longitudinally of the piece of material while said piece is in a flat or substantally flat condition, the piece afterwards being shaped to provide a base, and loops beyond the ends of the base that extend inwardly and over the base to provide opposed element-contacting portions, the aforesaid apertures being so related to the piece that one is substantially central of the base while those on the opposite sides of the central apertures occur in said element-contacting portions. With the fastener constructed in this manner, a screw, bolt or other entering elements may be projected through the aperture of the base and between said element contacting portions, such portions, by reason of their being perforated, affording multiple tooth-like contact with opposite sides of said element.

The embodiments of the invention herein disclosed are to be taken as illustrative rather than as limiting in that the shapes and structural details may vary to the extent permitted by the scope of the invention as defined by the claims appended hereto.

Figure 1:
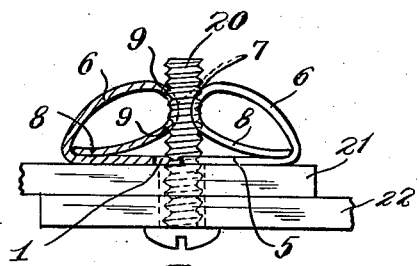
Figure 3:
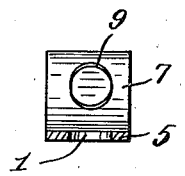
Figure 2:
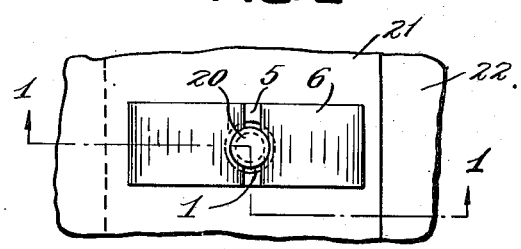
Figure 4:
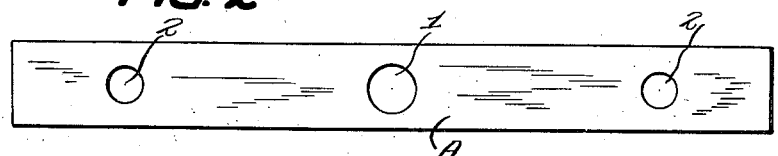
Figures 5, 6:
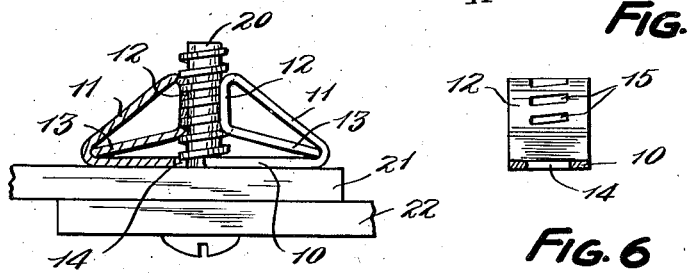

The objects and advantages above set out, with others that will appear as this description proceeds, are attained in the constructions shown in the accompanying drawing wherein Fig. 1 is a side elevational view, partly in section as indicated by the line 1—1 of Fig. 2, of a fastener embodying the invention, showing it applied to an entering element consisting of a screw by which two members are held together; Fig. 2 is a plan view of said fastener, and includes the parts associated therewith in Fig. 1; Fig. 3 is a central transverse section through the fastener shown in the preceding views; Fig. 4 is an elevational view of the blank from which the above mentioned fastener is constructed; Fig. 5 is a view, similar to Fig. 1, of a modified form of the invention, and Fig. 6 is a central transverse section through the same.

The fastener illustrated in Figs. 1 to 3 is formed from the blank shown in Fig. 4 and designated A, the same preferably being sheared from linear material or strip steel of a width corresponding to that of the finished article. Apertures are punched or otherwise formed in the blank, as indicated, the central one being designated 1, and the others, located relatively near the ends of the blank, 2.

In the fabrication of the fastener from the strip of material that constitutes said blank, the end portions of the strip are formed into loops, and said loops are turned inwardly over the middle part of the strip. Said middle part forms the base 5 of the fastener, centrally of which is located the aperture 1. The said loops include parts 6, element contacting portions or jaws 7, and struts 8, the terminals of the latter being engaged within the bights between the base 5 and parts 6. The apertures 2 are so spaced from the terminals of the struts that they occur within the element contacting portions or jaws 7 and provide, at the tops and bottoms thereof, tooth-like edges 9 for cooperation with the threads of a screw, bolt or the like, or with longitudinally spaced parts of an unthreaded entering element. While I have shown the apertures 2 as circular, or approximately so when the fastener is fabricated, they may be oblong, rectangular, or any other suitable shape, as in the form of a parallelogram with the edges defining the tops and bottoms of the apertures inclined to correspond substantially to the pitch of the threads of a screw type entering element.

Figs. 5 and 6 illustrate a fastener of the same general character as the one above described. Here, however, the loops that extend from the ends of the base 10 inwardly over the same are shown as triangular and include parts 11, element contacting portions or jaws 12, and struts 13. The strip from which this fastener is formed is perforated at its longitudinal center to provide an aperture 14, and also within the regions thereof that form the jaws 12, to provide slots 15. The parts between adjacent slots constitute teeth for cooperation with the threads of a screw type entering element wherewith the fastener is intended for use.

Associated with each of the fasteners shown in the drawing are a threaded entering element designated 20, and members 21 and 22 that are held together by said element in cooperation with the fastener. In the use of the fastener in such an association, the entering element 20 is first projected through aligned holes in the members 21 and 22 as far as it will go and the fastener is then applied to said element and forced therealong until the base of the fastener contacts the member 21. Now, by turning the entering element to the right, according to the illustrations, the jaws of the fastener are fed toward the base and the loops whereof said jaws are a part are placed under compression. By reason of this action, a very firm hold of the fastener upon the entering element is obtained.

Obviously, when the fastener is used with a smooth entering element, or one having transverse or circumferential ridges, or whose surface is roughened to increase friction, the compression of its looped ends is accomplished by forcing the jaws along the entering element toward the base of the fastener, as by means of a tubular or socketed tool or its equivalent placed over the end of the entering element in substantially axial alignment therewith and engaged with said looped ends.

While strip metal and strip steel have been given as examples of the linear material from which the fastener is constructed, any material suited to the purpose may be employed, as certain plastics, fiber, or wholly or partially non-metallic material.

Having thus described my invention, what I claim is:

1. A fastener comprising a base, a loop extending from an end of the base inwardly over the base and constituting an element contacting portion, the base having an aperture for the passage of an entering element, said contacting portion being perforated to produce tooth-like edges for engagement with one side of an entering element projected through said aperture, and a second element contacting portion for engagement with the other side of said element.

2. A fastener comprising a base, and loops extending from the ends of the base inwardly over the base and constituting opposed element contacting portions, the base having an aperture aligned with the space between said element contacting portions and each of said portions being perforated to provide tooth-like edges for engagement with an entering element projected through said aperture and between the said contacting portions.

3. A fastener constructed of an elongate piece of material perforated at substantially its longitudinal center to provide an aperture through which an entering element is adapted to be projected, the piece of material being shaped for a distance in opposite directions from said aperture to provide a base, and beyond the ends of the base to provide loops that are turned inwardly over the base and constitute opposed element contacting portions, said element contacting portions being apertured to produce tooth-like edges for engagement with the entering element.

4. A fastener constructed of an elongate piece of material perforated at substantially its longitudinal center to provide an aperture through which a threaded entering element is adapted to be projected, the piece of material being shaped for a distance in opposite directions from said aperture to provide a base, and beyond the ends of the base to provide loops that are turned inwardly over the base and constitute opposed element contacting portions, each of said element contacting portions having a plurality of perforations in the form of slots that extend transversely of said contacting portions thereby to provide parts intermediate the slots for cooperation with the threads of the entering element.

5. A fastener constructed of an elongate piece of material perforated at substantially its longitudinal center to provide an aperture through which a screw is adapted to be projected, the piece of material being shaped for a distance in opposite directions from said aperture to provide a base, and beyond the ends of the base to provide loops that extend inwardly over the base and parts of which constitute opposed jaws, each of the jaws having a plurality of perforations in the form of slots that are inclined to correspond substantially with the pitch of the thread of said screw and adapted to receive parts of said thread when the entering element is projected through the aforesaid aperture and between said jaws.

JOHN W. SIMMONS.